United States Patent
Wada

(10) Patent No.: US 6,826,771 B1
(45) Date of Patent: Nov. 30, 2004

(54) DISK HOLDING DEVICE

(75) Inventor: Shinichi Wada, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/979,639

(22) PCT Filed: May 26, 2000

(86) PCT No.: PCT/JP00/03427

§ 371 (c)(1),
(2), (4) Date: Jan. 15, 2002

(87) PCT Pub. No.: WO00/74050

PCT Pub. Date: Dec. 7, 2000

(30) Foreign Application Priority Data

May 27, 1999 (JP) .......................................... 11-147613

(51) Int. Cl.$^7$ ........................................... G11B 17/028
(52) U.S. Cl. ....................................... 720/707; 369/264
(58) Field of Search ................................. 369/264, 270, 369/271; 720/707

(56) References Cited

U.S. PATENT DOCUMENTS 6,208,613 B1 * 3/2001 Iizuka ........................ 369/271

FOREIGN PATENT DOCUMENTS

| JP | 15-14050 | | 9/1940 | | |
|----|----------|---|--------|---|---|
| JP | 2-80361 | | 6/1990 | | |
| JP | 8-115562 | | 5/1996 | | |
| JP | 08315475 A | * | 11/1996 | ........... | G11B/17/02 |
| JP | 09198760 A | * | 7/1997 | ......... | G11B/17/028 |
| JP | 09320158 A | * | 12/1997 | ......... | G11B/17/028 |
| JP | 10-162497 | | 6/1998 | | |
| JP | 10-188418 | | 7/1998 | | |
| JP | 11039757 A | * | 2/1999 | ......... | G11B/17/028 |
| JP | 11-86396 | | 3/1999 | | |
| JP | 11066788 A | * | 3/1999 | ........... | G11B/23/00 |
| JP | 11-120651 | | 4/1999 | | |
| JP | 11-120652 | | 4/1999 | | |
| JP | 11-120653 | | 4/1999 | | |
| JP | 11-203755 | | 7/1999 | | |
| JP | 11-213498 | | 8/1999 | | |

* cited by examiner

Primary Examiner—William Klimowicz
(74) Attorney, Agent, or Firm—Wenderoth, Lind & Ponack, L.L.P.

(57) ABSTRACT

A disk holding device according to the present invention is constituted by a turntable (21), a center hub (25), plural claw-shaped members (26), elastic members (27) which energize the claw-shaped members (26) in the direction of the radius of a disk (23), a centering ring (28) having an inclined portion (28b), which ring is movable in the direction vertical to the disk surface, and an elastic member (29) which energizes the centering ring (28) in the direction along which the disk (23) is pushed up. The internal diameter of the disk (23) engages with the inclined portion (28a) before a cylindrical portion of the internal diameter of the disk (23) gets over the claw-shaped members (26), whereby centering of the disk (23) is performed, and then the disk (23) is held. The disk holding device constructed as described above is able to hold an optical disk such as a CD, a DVD, or the like, and perform more reliable centering of the disk. In addition, the products can be slimed down, and further the number of parts and the amount of assembly work can be reduced.

4 Claims, 7 Drawing Sheets

DISK HOLDING DEVICE

TECHNICAL FIELD

The present invention relates to a disk holding device for holding a disk in an optical disk drive or the like.

BACKGROUND ART

In recent years, a compact, lightweight, and slim optical disk drive has been increasingly developed so that the optical disk drive can be contained in a notebook type personal computer. With the development of such optical disk drive, a disk holding device, which is slimed down by self-locking a disk on a turntable, has also been developed.

Japanese Published Patent Application No. Hei.10-188418 discloses a conventional disk holding device in which a disk holding mechanism and a disk centering mechanism are integrated into a turntable unit so that a single spindle motor unit can hold every optical disk as well as simultaneously adjust the center position of the optical disk (hereinafter, referred to as centering). FIGS. 5 through 7 illustrate a disk holding device for holding a bonded disk (a DVD disk) which has been recently developed. FIG. 5 is a cross-sectional view of the disk holding device in the state where the disk is not loaded. FIG. 6 is a cross-sectional view of the disk holding device in the state where the disk is loaded. FIG. 7 is a top view of the disk holding device.

Hereinafter, the conventional disk holding device will be described with reference to the drawings.

A spindle motor 32 is mainly divided into a turntable unit 33 which holds a disk 23 and a driving unit 37 which rotates the disk 23. First of all, claw-shaped members 26 which interfere with an edge of an internal diameter portion of the disk 23 are provided in at least three positions on the turn table 21 to hold the disk 23. Each claw-shaped member 26 is pressed by an elastic member 27, and ribs 26a on both sides of each claw-shaped member 26 are supported by a straight guide (not shown) of a center hub 25. The driving unit 37 is a component which mainly makes up a magnetic circuit, and it comprises a rotor yoke 34, a magnet 35, a coil 36, a base plate 39, a metal bearing unit 38 which supports a spindle shaft 24 forcibly inserted into the turntable 21, and the like. The spindle shaft 24 slides on a thrust bearing 40. Further, a Hall element 41 is disposed on a flexible printed circuit, FPC 42.

Next, holding of the conventional disk and the operation of a centering ring will be described.

When the disk 23 is loaded, the disk 23 is put on the turntable 21 while slope portions 26b of the claw-shaped members 26 arranged in at least three positions are being pressed down from above. At this time, each claw-shaped member 26 slides along a guide (not shown) in the center hub 25 while giving a repulsive force to the elastic member 27, and hides in the center hub 25. Further, an under-internal-diameter edge portion 23a, which is a lower edge portion of the internal diameter portion of the disk 23, is engaged with an inclined portion 28a of the centering ring 28 just before the disk 23 adheres to a slip sheet 22 bonded on the turntable 21, and the disk 23 is held by the claw-shaped members 26 arranged in at least three positions while being pressed by the elastic members 27 again. At this time, since a force always acts in the direction in which the disk 23 is pushed up by three elastic members 29, the centering ring 28 can center the disk 23.

However, since, in this conventional structure, the centering ring 28 is arranged under the center hub 25, the timing at which the disk 23 is engaged with the inclined portion 28a of the centering ring 28 and the timing at which the disk 23 adheres to the slip sheet 22 bonded on the turntable 21 to be held by the claw-shaped members 26 are almost simultaneous. Therefore, if the disk 23 is obliquely inserted, the edge portion 23a under the internal diameter of the disk 23 is not correctly engaged with the inclined portion 28a of the centering ring 28, resulting in deterioration of centering accuracy.

Further, in order to slim down the products, the elastic members 29 for pushing up the centering ring 28 must be arranged at every 120°, i.e., in three positions, on the turntable 21, whereby the number of parts and the amount of assembly work are increased, resulting in increased costs of the products.

The present invention is made to solve the above-described problems and has for its object to provide a disk holding device which can slim down the products, can perform holding and centering of a disk with reliability, and further can reduce the number of parts and the amount of assembly work.

DISCLOSURE OF THE INVENTION

A disk holding device according to one embodiment of the present invention comprises a turntable which is provided rotatably by a driving mechanism; a center hub which generally engages with the internal diameter of a disk provided on the turntable; plural claw-shaped members which are contained in the center hub; elastic members which energize the plural claw-shaped members in the direction of the radius of the disk; a centering ring for adjusting the center position of the disk, which centering ring is positioned beneath the center hub and is movable in the direction vertical to the disk surface; an elastic member which energizes the centering ring in the direction along which the disk is pushed up; and an inclined portion which is provided in the centering ring and engages with the internal diameter of the disk; wherein the inclined portion is positioned on the periphery of the center hub, and engages with the internal diameter of the disk before a cylindrical portion of the internal diameter of the disk gets over the claw-shaped members.

According to the disk holding device constructed as described above, centering of the disk is performed before the disk is held on the turntable by the claw-shaped members, and thereafter the disk is held, whereby more accurate holding and centering of the disk can be realized.

According to the present invention, in the disk holding device as discussed above, the centering ring and the elastic member which energizes the centering ring in the direction along which the disk is pushed up are arranged in a space between a coil of the driving mechanism which rotates the turntable, and a bearing metal unit which supports a spindle shaft forcibly inserted into the turntable.

According to the disk holding device constructed as described above, vertical strokes of the centering ring can be increased without increasing the thickness of the products, and the inclined portion of the centering ring which centers the disk can be arranged on the peripheral side surface of the center hub, and further, the number of parts can be reduced, thereby realizing cost reduction.

BEST MODE FOR CARRYING OUT THE INVENTION (Embodiment 1)

Hereinafter, a first embodiment of the present invention will be described with reference to FIGS. 1 to 4.

Figure 1:
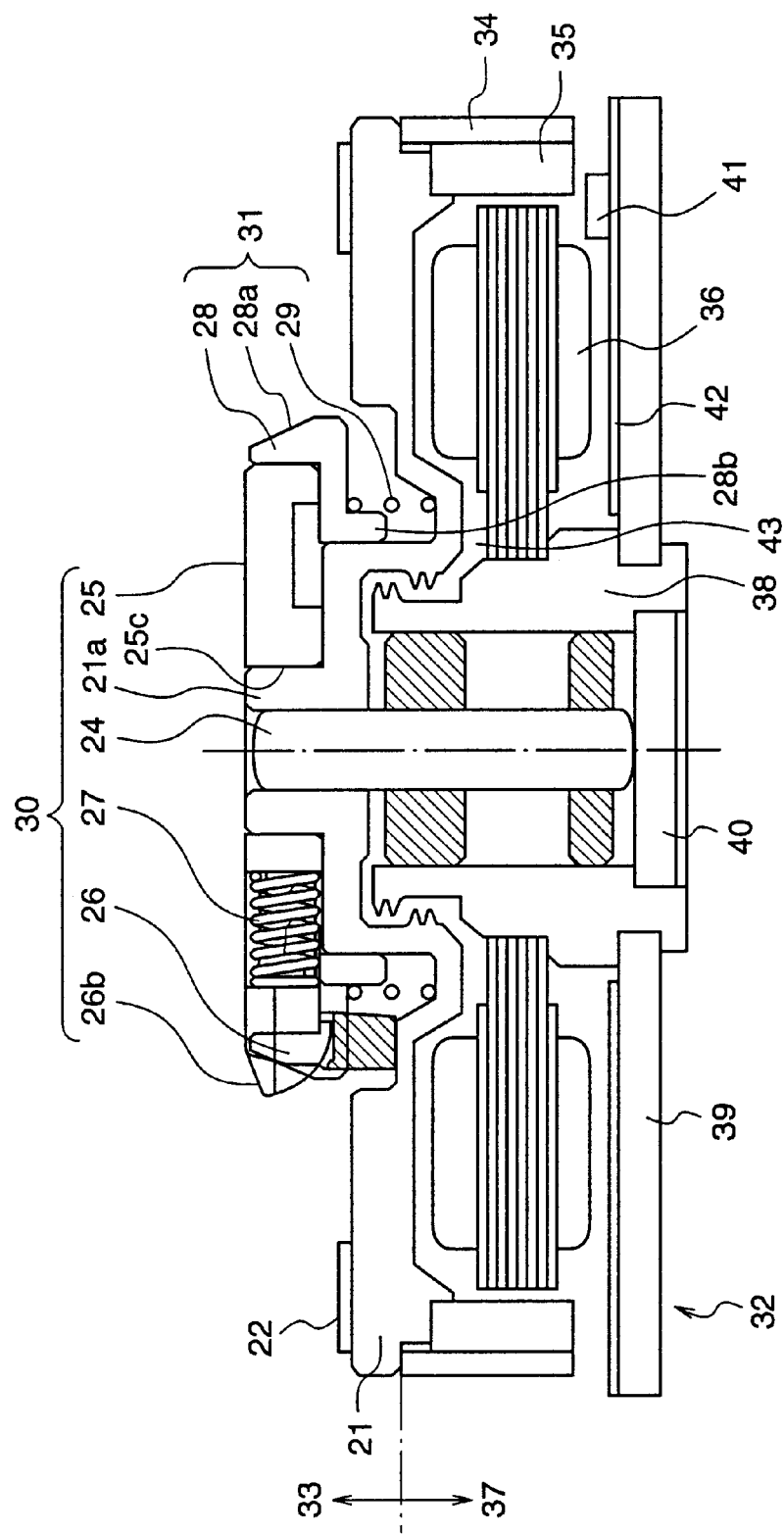
FIG. 1 is across-sectional view of a disk holding device according to a first embodiment of the present invention, in the state where no disk is loaded.
Figure 2:
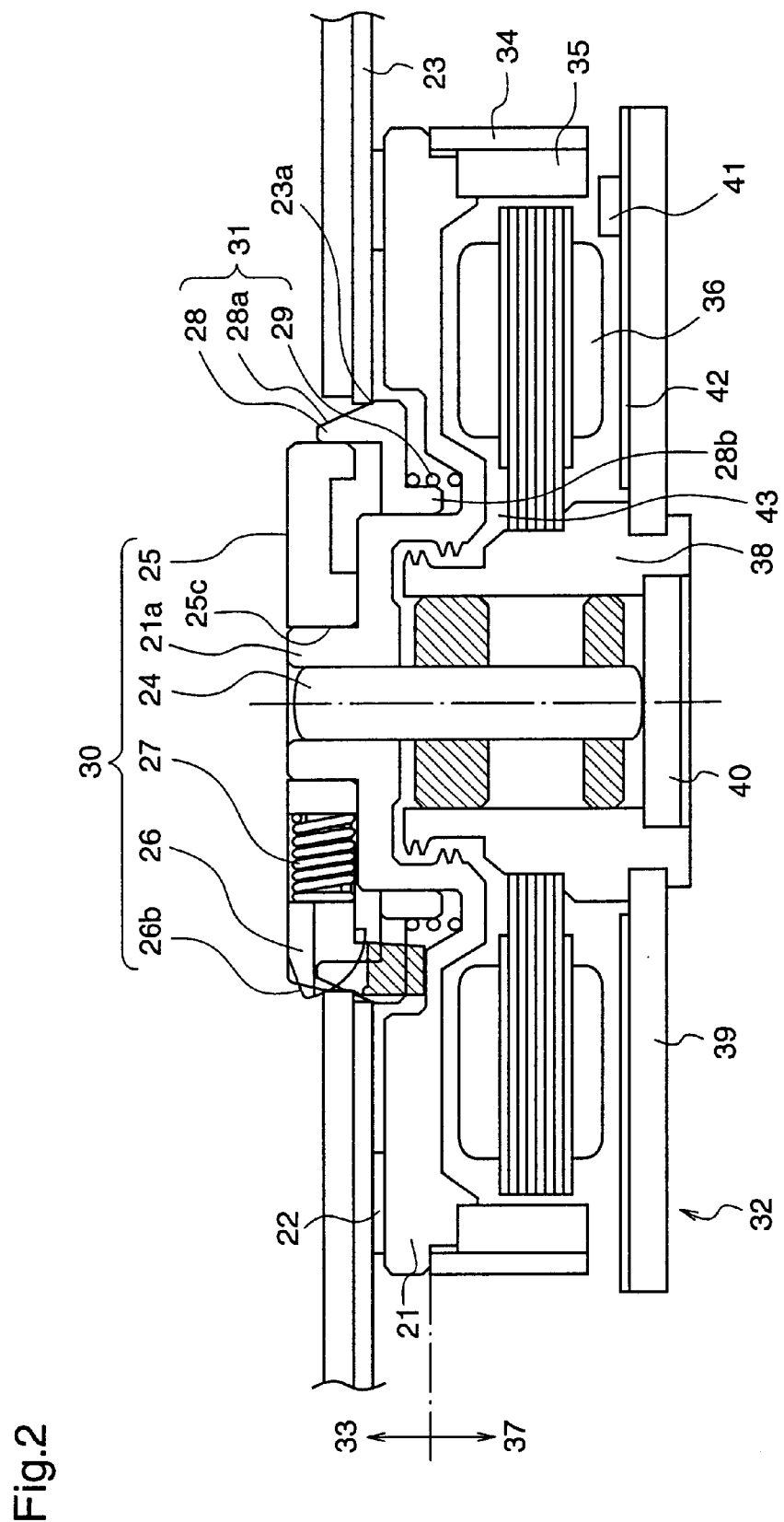
FIG. 2 is a cross-sectional view of the disk holding device according to the first embodiment of the present invention, in the state where a disk is loaded.
Figure 3:
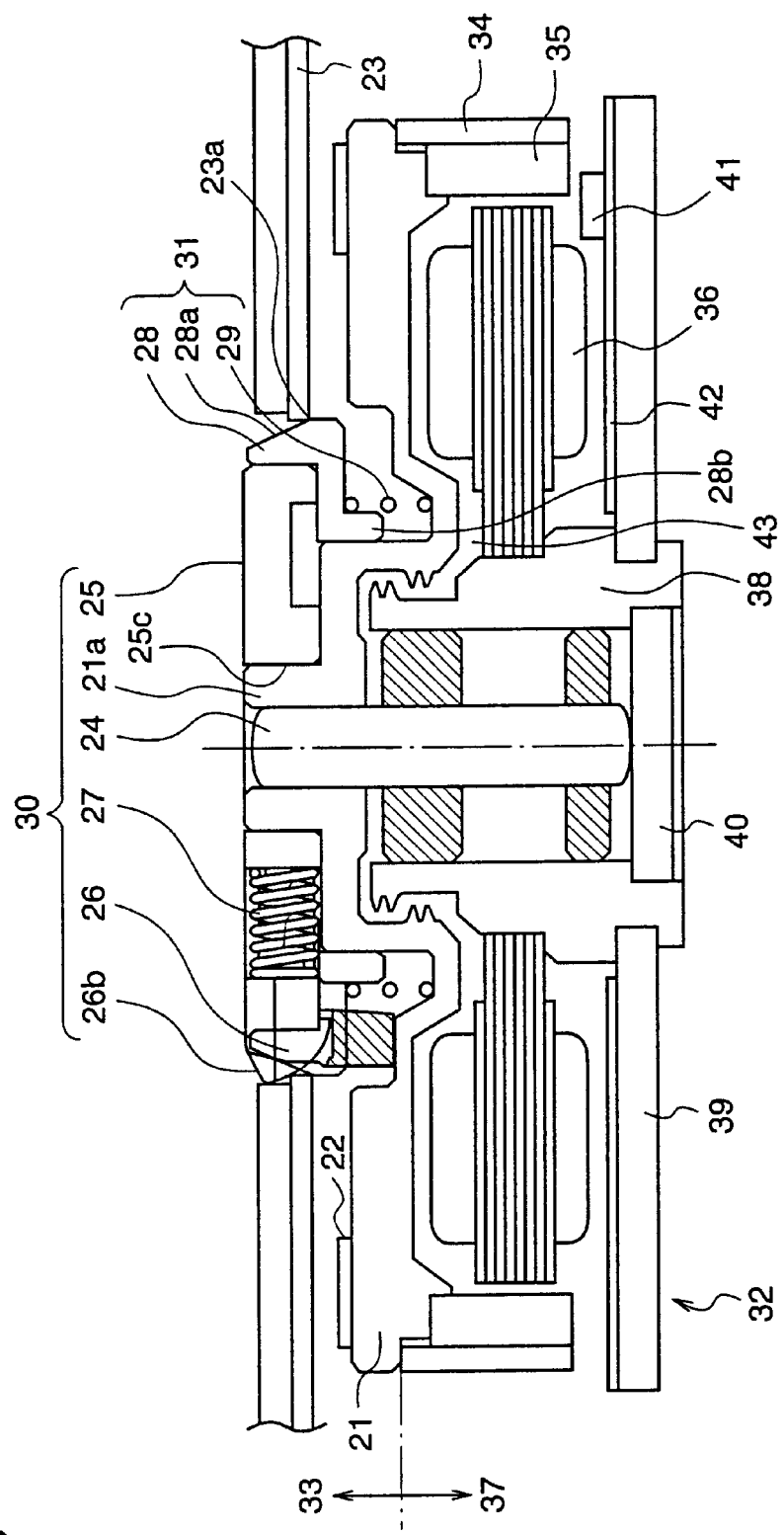
FIG. 3 is a cross-sectional view of the disk holding device according to the first embodiment of the present invention, in the state where a disk is being loaded.
Figure 4:
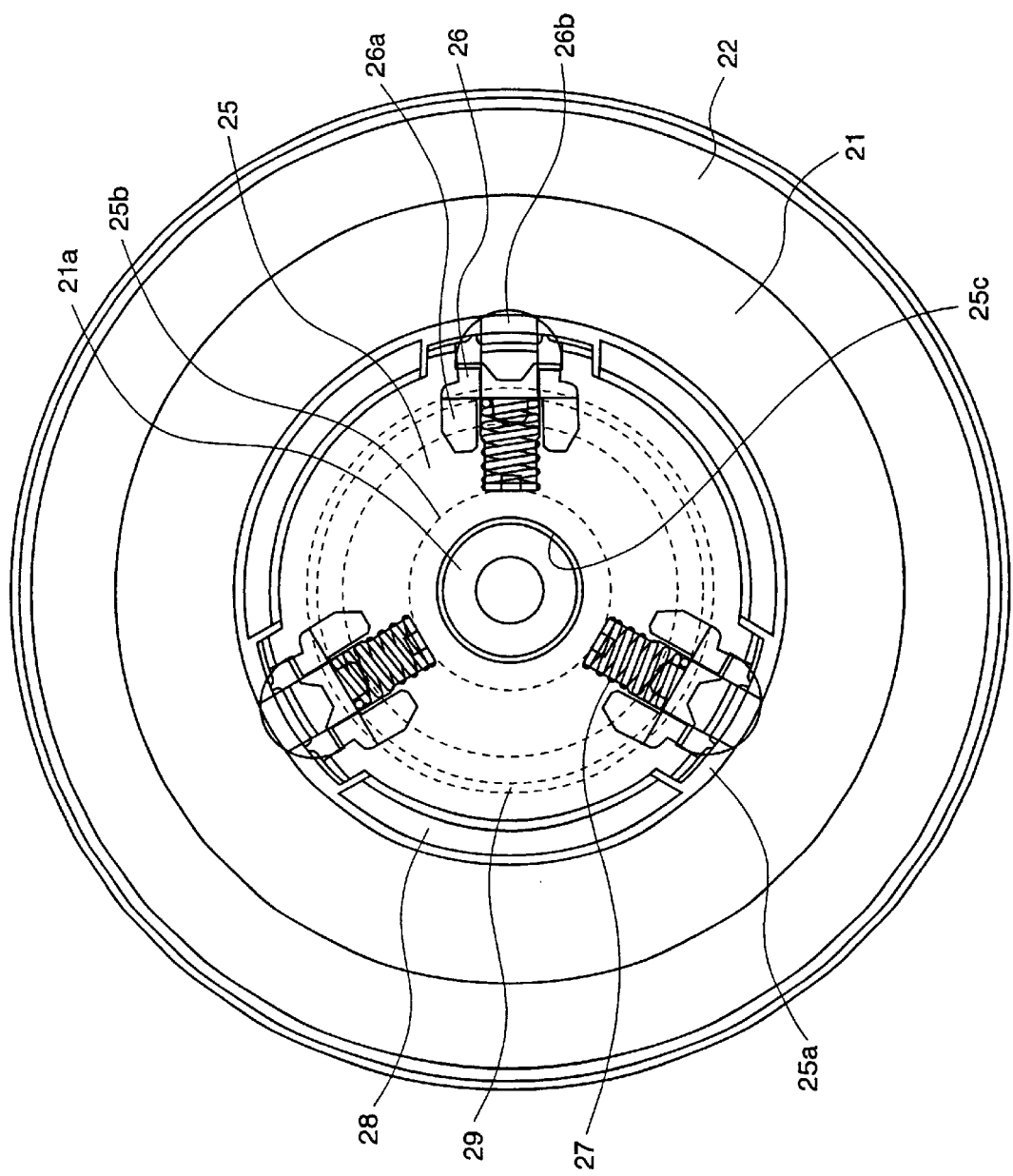
FIG. 4 is a top view of the disk holding device according to the first embodiment of the present invention.
Figure 5:
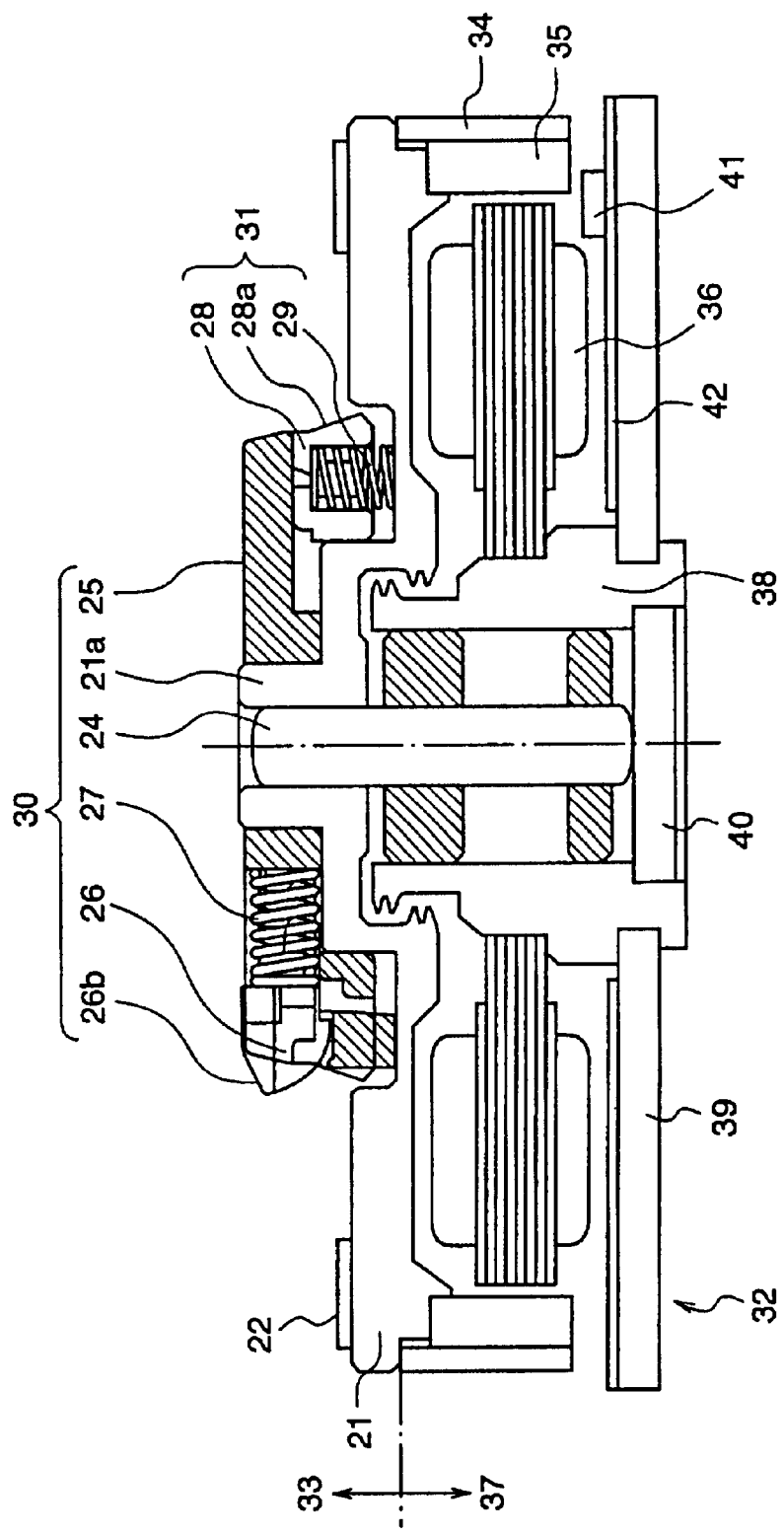
FIG. 5 is a cross-sectional view of the conventional disk holding device in the state where no disk is loaded.
Figure 6:
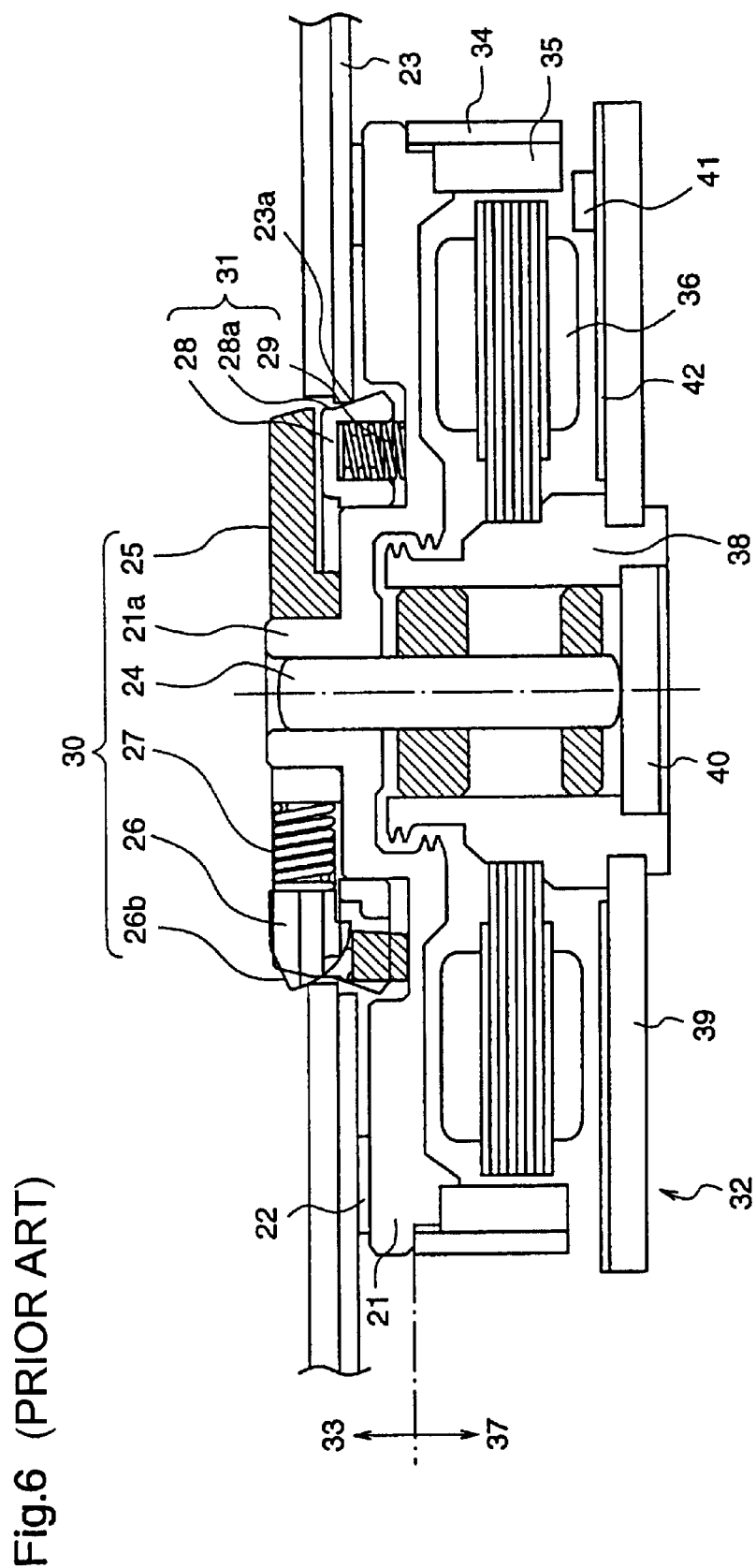
FIG. 6 is a cross-sectional view of the conventional disk holding device in the state where a disk is loaded.
Figure 7:
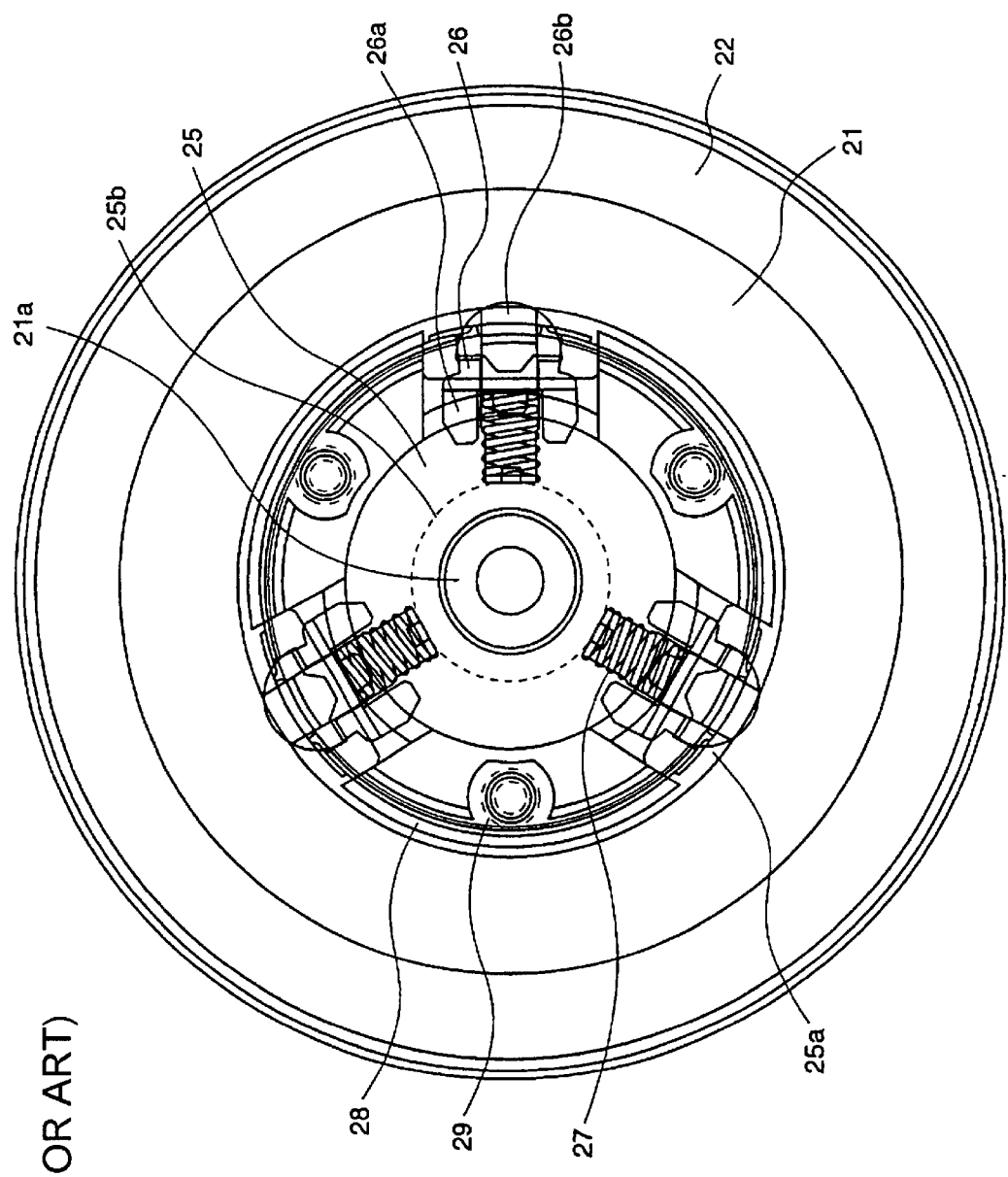
FIG. 7 is a top view of the conventional disk holding device.

FIG. 1 is a cross-sectional view of a disk holding device according to the first embodiment of the present invention in the state where no disk is loaded. FIG. 2 is a cross-sectional view of the disk holding device according to the first embodiment of the present invention in the state where a disk is loaded. FIG. 3 is a cross-sectional view of the disk holding device according to the first embodiment of the present invention in the course of loading a disk. Further, FIG. 4 is a top view of the disk holding device according to the first embodiment of the present invention.

In FIGS. 1 to 4, a turntable unit 33 comprises a disk centering mechanism part 31 which centers a disk 23, a disk holding mechanism part 30 which holds the disk 23, and a turntable 21. The disk centering mechanism part 31 is positioned beneath the disk holding mechanism part 30. An inclined portion 28a of a centering ring 28 which engages with the internal diameter of the disk 23 is positioned on the peripheral side surface of a center hub 25. Further, a driving unit 37 has a radial-gap-type structure as shown in FIGS. 1 and 2. The driving unit 37 is a component which mainly makes up a magnetic circuit, and it comprises a rotor yoke 34, a magnet 35, a coil 36, a base plate 39, a metal bearing unit 38 which supports a spindle shaft 24 forcibly inserted into the turntable 21, and the like. The spindle shaft 24 slides on a thrust bearing 40. Further, a Hall element 41 is arranged on an FPC 42.

The disk centering mechanism part 31 is composed of the centering ring 28 and an elastic member 29. The centering ring 28 is movable in the vertical direction to the disk surface. Further, the elastic member 29 is guided on the peripheral side surface of a cylindrical portion 28b of the centering ring 28 so that the centering ring 28 is always energized in the direction along which the disk 23 is pushed up, and positional regulation of the disk 23 is performed in the center hub 25 that generally engages with the internal diameter of the disk 23. The centering ring 28 and the elastic member 29 that energizes the centering ring 28 in the direction along which the disk is pushed up are arranged by utilizing a space 43 between the coil 36 of the driving unit 37 and the bearing metal bearing unit 38.

Further, the disk holding mechanism part 30 has a structure in which claw-shaped members 26 that engage with the internal diameter of the disk 23 are arranged along the periphery of the center hub 25 at every 120° in three positions. Each claw-shaped member 26 has bosses 26a on both sides. The bosses 26a of the claw-shaped member 26 are engaged with a guide groove which is provided in the center hub 25 but is not shown in the figure, whereby the claw-shaped member 26 is slidably supported by the center hub 25 in the radial direction of the disk 23. The claw-shaped member 26 engages with an end of the elastic member 27 contained in the center hub 25, and it is subjected to regulation in the vicinity of a center hub window 25a while being pressed by the elastic member 27. The bosses 26a of the claw-shaped member 26 touch an end portion of a guide groove, which is not shown, of the center hub 25, thereby., performing this regulation. Preferably, a deformed ball made of a resin, which is flattened into a claw shape, is employed as the claw-shaped member 26. The other end of the elastic member 27 is fixed to the center hub 25 by a center hub boss 25b. Preferably, a compression spring or the like can be employed as the elastic member 27.

This structure enables sliming-down of the disk holding mechanism. A turntable protrusion 21a is forcibly inserted into the internal diameter portion of the center hub 25 having the disk holding mechanism. Further, a slip sheet 22 by which a slipping frictional torque of the disk 23 is properly given is affixed within a range of a radius of 12~14 mm from the internal circumference side on the flat surface of the peripheral part of the turntable 21.

Next, the operation of the disk holding device according to the first embodiment will be described. When the disk 23 is loaded on the disk holding device, as shown in FIG. 3, initially, an under-internal-diameter edge portion 23a, which is a lower edge portion of the internal diameter portion of the disk 23, engages with the inclined portion 28a of the centering ring 28 arranged on the peripheral side surface of the center hub 25, and centering is performed before the disk 23 is held on the turntable 21 by the claw-shaped members 26. Thereafter, the disk 23 gets over the claw-shaped members 26, adheres to the slip sheet 22 affixed on the turntable 21, and is held on the turntable 21 by the claw-shaped members 26 pressed by the elastic members 27.

In the disk holding device according to the first embodiment, the inclined portion 28a of the centering ring 28, which portion is provided in the centering ring 2,8 that centers the disk, is positioned on the periphery of the center hub 25 and engages with the internal diameter of the disk 23. Further, while the disk 23 is being loaded on the turntable 21, the inclined portion 28a of the centering ring 28 engages with the internal diameter part of the disk 23, and the centering ring 28 centers the disk 23. After centering the disk 23, the disk 23 is held on the turntable 21. Therefore, the disk 23 is accurately centered to be held on the turntable 21. Further, even when the internal diameter of the disk 23 varies, the inclined portion 28a can absorb the variation in the internal diameter. Further, the number of parts of the disk holding device can be reduced, thereby realizing cost reduction. Further, since the centering ring 28 and the elastic member 29 are arranged by utilizing the space 43 between the coil 36 of the driving unit 37 and the bearing metal unit 38, also in the turntable unit 33 which is slimed-down, sufficient strokes can be ensured in the thrust direction which is necessary for the disk centering mechanism part 31 without increasing the thickness of the turntable unit 33.

Industrial Availability

As described above, the disk holding device according to the present invention can realize accurate holding and centering of a disk. In addition, vertical strokes of the centering ring can be increased without increasing the thickness of the products. Therefore, the number of parts can be reduced, thereby realizing cost reduction. Especially, the disk holding device is effective in media that require highly accurate centering of optical disks such as a DVD-RAM, a DVD-ROM, and the like.

What is claimed is:

1. A disk holding device comprising:
   a turntable which is provided rotatably by a driving mechanism;
   a center hub operable to engage with an internal diameter of a disk provided on said turntable;
   plural claw-shaped members contained in said center hub;
   elastic members operable to energize said plural claw-shaped members in the direction of the radius of the disk;
   a centering ring operable to adjust a center position of the disk, said centering ring being positioned beneath said center hub and being movable in a direction normal to the disk surface;
   an elastic member operable to energize said centering ring in the direction normal to the disk surface; and
   an inclined portion provided in said centering ring, said inclined portion being operable to engage with the internal diameter of the disk;
   wherein when the disk is not placed on said turntable, sliding of said claw-shaped members in the external disk diameter direction is restricted by engaging a part of each of said claw-shaped members with a corresponding part of said center hub, and
   wherein said inclined portion is positioned on the periphery of said center hub and is operable to engage with the internal diameter of the disk before a cylindrical portion of the internal diameter of the disk gets over the claw-shaped members.

2. A disk holding device as defined in claim 1, wherein said centering ring and said elastic member, which is operable to energize said centering ring in the direction normal to the disk surface, are arranged in a space between a coil of the driving mechanism which rotates said turntable, and a metal bearing unit which supports a spindle shaft forcibly inserted into said turntable.

3. A device comprising:
   a turntable;
   a driving mechanism operable to rotate said turntable;
   a center hub operable to engage with an internal diameter of a disk provided on said turntable;
   plural claw-shaped members contained in said center hub;
   elastic members operable to energize said plural claw-shaped members in the direction of the radius of the disk;
   a centering ring operable to adjust a center position of the disk, said centering ring being positioned beneath said center hub and being movable in a direction normal to the disk surface;
   an elastic member operable to energize said centering ring in the direction normal to the disk surface; and
   an inclined portion provided in said centering ring, said inclined portion being operable to engage with the internal diameter of the disk;
   wherein when the disk is not placed on said turntable sliding of said claw-shaped members in the external disk diameter direction is restricted by engaging a part of each of said claw-shaped members with a corresponding part of said center hub, and
   wherein said inclined portion is positioned on the periphery of said center hub and is operable to engage with the internal diameter of the disk before a cylindrical portion of the internal diameter of the disk gets over the claw-shaped members.

4. A device as defined in claim 3, further comprising:
   a spindle shaft located at the center of said turntable; and
   a metal bearing unit operable to support said spindle shaft;
   wherein said driving mechanism includes a coil, and
   wherein said centering ring and said elastic member, which is operable to energize said centering ring in the direction normal to the disk surface, are arranged in a space between said coil and said metal bearing unit.

* * * * *